United States Patent
Park et al.

(10) Patent No.: US 9,882,870 B2
(45) Date of Patent: Jan. 30, 2018

(54) SYSTEM AND METHOD FOR INTEGRATED MANAGEMENT OF TERMINAL INFORMATION IN IPV6 ENVIRONMENT

(71) Applicant: SAMSUNG SDS CO., LTD., Seoul (KR)

(72) Inventors: Seon Ok Park, Gwacheon-si (KR); Jong Ho Kim, Gwacheon-si (KR); Jae Sang Jung, Gwacheon-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 628 days.

(21) Appl. No.: 14/289,077

(22) Filed: May 28, 2014

(65) Prior Publication Data

US 2014/0359162 A1 Dec. 4, 2014

(30) Foreign Application Priority Data

May 28, 2013 (KR) ........................ 10-2013-0060512

(51) Int. Cl.
*G06F 15/16* (2006.01)
*H04L 29/12* (2006.01)

(52) U.S. Cl.
CPC ........ *H04L 61/2015* (2013.01); *H04L 61/103* (2013.01); *H04L 61/2092* (2013.01); *H04L 61/6009* (2013.01); *H04L 61/6059* (2013.01)

(58) Field of Classification Search
CPC ........................... H04L 69/167; H04L 61/1511
USPC ....................................................... 709/245
See application file for complete search history.

(56) References Cited

U.S. PATENT DOCUMENTS

| | | | | | |
|---|---|---|---|---|---|
| 6,118,784 | A * | 9/2000 | Tsuchiya | ................. | H04L 12/66 370/392 |
| 7,788,477 | B1 * | 8/2010 | Huang | .................. | G06F 9/4416 713/1 |
| 7,941,512 | B2 * | 5/2011 | Droms | ................ | H04L 12/2801 709/222 |
| 2002/0021703 | A1 * | 2/2002 | Tsuchiya | ................. | H04L 12/66 370/401 |
| 2006/0067343 | A1 * | 3/2006 | Tagawa | .................... | H04L 41/22 370/401 |
| 2006/0126629 | A1 * | 6/2006 | Dooley | ............. | H04L 29/12283 370/392 |
| 2007/0258399 | A1 * | 11/2007 | Chen | ................. | H04L 29/12358 370/328 |

(Continued)

*Primary Examiner* — Kevin Bates
*Assistant Examiner* — Clarence McCray
(74) *Attorney, Agent, or Firm* — Sughrue Mion, PLLC (57) ABSTRACT

Provided are an apparatus and method for integrated management of terminal information in an IPv6 environment. The apparatus for integrated management of terminal information in the IPv6 environment includes a first data collection unit that receives, from at least one Neighbor Discovery (ND) cache, address information of at least one terminal acquired by the ND cache, a second data collection unit that receives, from a DHCPv6 server, IPv6 address allocation information allocated to the at least one terminal by the DHCPv6 server, and a data linkage/storage unit that generates integrated terminal management information linked with the received address information and IPv6 address allocation information, and stores and manages the generated integrated terminal management information.

18 Claims, 6 Drawing Sheets

(56) References Cited

U.S. PATENT DOCUMENTS

| | | | |
|---|---|---|---|
| 2008/0043614 A1* | 2/2008 | Soliman | H04W 8/065 370/208 |
| 2008/0062468 A1* | 3/2008 | Shouno | G06K 15/00 358/3.03 |
| 2008/0107067 A1* | 5/2008 | Baek | H04L 29/06027 370/328 |
| 2008/0281973 A1* | 11/2008 | Yang | H04L 29/12273 709/228 |
| 2008/0307079 A1* | 12/2008 | Choi | H04L 29/12358 709/223 |
| 2008/0320111 A1* | 12/2008 | Yan | H04L 12/2898 709/220 |
| 2011/0004674 A1* | 1/2011 | Zheng | H04L 29/12264 709/220 |
| 2011/0110375 A1* | 5/2011 | Boucadair | H04L 29/12358 370/393 |
| 2011/0182295 A1* | 7/2011 | Singh | H04L 41/0816 370/401 |
| 2012/0102213 A1* | 4/2012 | Qian | H04L 41/5022 709/230 |
| 2012/0191825 A1* | 7/2012 | Dai | H04L 29/12283 709/220 |
| 2013/0010614 A1* | 1/2013 | Lin | H04L 12/2898 370/250 |
| 2013/0086384 A1* | 4/2013 | Perez | G06F 1/3209 713/175 |
| 2013/0238769 A1* | 9/2013 | Asati | H04L 61/103 709/220 |
| 2013/0275574 A1* | 10/2013 | Hugard, IV | H04L 63/10 709/224 |
| 2014/0089478 A1* | 3/2014 | Seed | H04W 4/001 709/222 |
| 2014/0313933 A1* | 10/2014 | Chen | H04L 12/6418 370/254 |

* cited by examiner

SYSTEM AND METHOD FOR INTEGRATED MANAGEMENT OF TERMINAL INFORMATION IN IPV6 ENVIRONMENT

CROSS-REFERENCE TO RELATED APPLICATION

This application claims priority to and the benefit of Korean Patent Application No. 10-2013-0060512, filed on May 28, 2013, the disclosure of which is incorporated herein by reference in its entirety.

BACKGROUND

1. Field

The present disclosure relates to technologies for managing terminal information in an IPv6 environment.

2. Discussion of Related Art

A method of allocating an IP address (IPv6 address) to a terminal in an IPv6 environment may be classified as a method of allocating a stateless address or a method of allocating a stateful address.

In the method of allocating the stateless address, there is no separate DHCPv6 server, and a terminal connected to a network determines information of other terminals by a Neighbor Discovery (ND) protocol and then assigns its own IP. However, in the method of allocating the stateless address, IP allocation time information of the terminal is not included in the ND protocol, and therefore a time when the IP was initially allocated to each terminal may not be known.

In addition, in the method of allocating the stateful address, a separate DHCPv6 allocates an IP in response to the request of each terminal in the same manner as in IPv4. However, in the method of allocating the stateful address, a DHCPv6 server assigns the IP to the terminal based on a DUID value rather than based on a MAC address of the terminal, and therefore the MAC address of each terminal may not be known. However, the MAC address of the terminal is absolutely necessary for controlling the terminal in network equipment, and therefore, when using the method of allocating the stateful address, a separate means for acquiring the MAC address of each terminal is required.

That is, regardless of what method is used to allocate the IP address in the IPv6 environment, there are difficulties in acquiring all required information, and therefore there is a demand for a means for integrated management of information of each terminal.

SUMMARY

The present disclosure is directed to a means for integrated storage and management of information allocated to each terminal in an IPv6 environment.

According to an aspect of the present disclosure, there is provided an apparatus for integrated management of terminal information in an IPv6 environment, the apparatus including: a first data collection unit that receives, from at least one Neighbor Discovery (ND) cache, address information of at least one terminal acquired by the ND cache; a second data collection unit that receives, from a DHCPv6 server, IPv6 address allocation information allocated to the at least one terminal by the DHCPv6 server; and a data linkage/storage unit that generates integrated terminal management information linked with the received address information and IPv6 address allocation information, and stores and manages the generated integrated terminal management information.

According to another aspect of the present disclosure, there is provided a method for integrated management of terminal information in an IPv6 environment, which is performed in an apparatus for integrated management of terminal information, the method including: receiving, by a first data collection unit, address information of at least one terminal acquired by at least one ND cache from the at least one ND cache; receiving, by a second data collection unit, IPv6 address allocation information allocated to the at least one terminal by a DHCPv6 server from the DHCPv6 server; and generating and managing, by a data linkage/storage unit, integrated terminal management information linked with the received address information and IPv6 address allocation information.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the attached drawings. However, the present disclosure is not limited to the exemplary embodiments disclosed below.

When it is determined that the detailed description of known art related to the present disclosure may obscure the gist of the present disclosure, such detailed description will be omitted. The same reference numerals are used to refer to the same elements throughout the specification. Terminology described below is defined considering functions in the present disclosure and may vary according to a user's or operator's intention or usual practice. Thus, the meanings of the terminology should be interpreted based on the overall context of the present specification.

Consequently, the technical spirit the present disclosure is determined by the claims, and the following embodiments are merely a means of efficiently explaining technical concepts of the present disclosure to those skilled in the art to which the present disclosure pertains.

Figure 1:
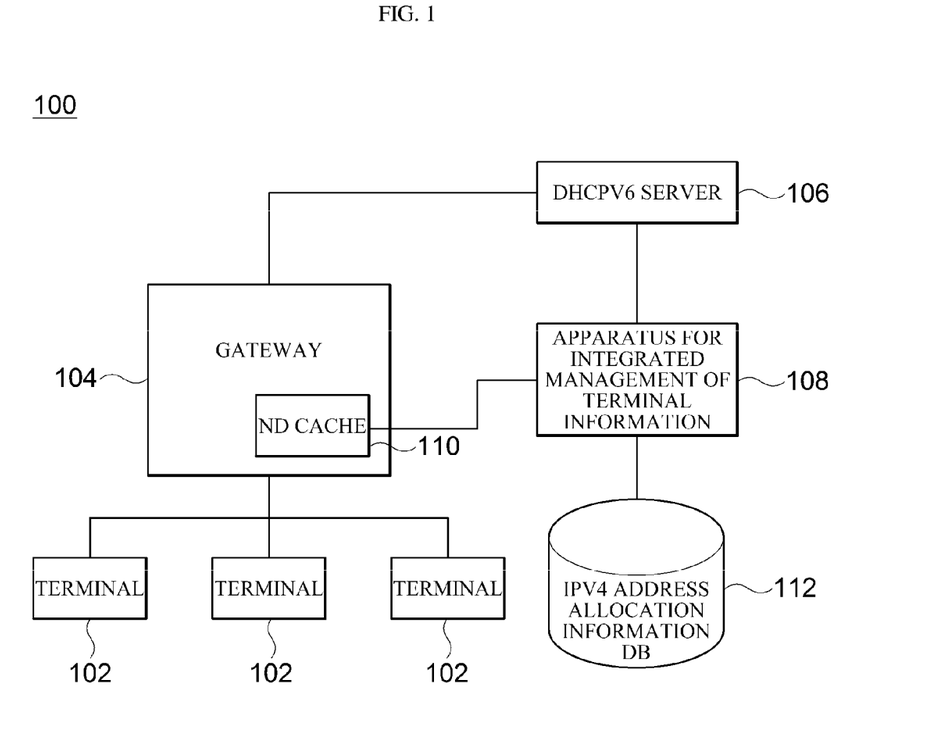
FIG. 1 is a block diagram illustrating a system 100 for integrated management of terminal information in an IPv6 environment according to an embodiment of the present disclosure.

FIG. 1 is a block diagram illustrating a system 100 for integrated management of terminal information in an IPv6 environment according to an embodiment of the present disclosure. As shown in FIG. 1, the system 100 for integrated management of terminal information in the IPv6 environment according to an embodiment of the present disclosure includes a terminal 102, a gateway 104, a DHCPv6 server 106, and an apparatus 108 for integrated management of terminal information.

The terminal 102 is a user device that is connected to an external network not illustrated) through the gateway 104 to transmit and receive data, and may include all types of devices enabling packet communication through a network such as an Internet phone (VoIP phone), a personal computer, a smartphone, a tablet PC, other OA equipment, and the like. The terminal 102 according to an embodiment of the present disclosure may be basically constituted of an IPv6 terminal enabling packet communication using an IPv6 address, and may be constituted of a dual stack terminal capable of simultaneously using an IPv4 address and the IPv6 address, as necessary.

The gateway 104 is a device for relaying communication between the terminal 102 and an external network, and includes a Neighbor Discovery (ND) cache 110. The gateway 104 performs communication with the terminal 102 using an IPv6 ND protocol to mutually determine positions of the other parties on the network. In the ND cache 110 within the gateway 104, address information of the terminal 102 acquired as a result of IPv6 ND protocol communication is stored. In this instance, the address information may include an IPv6 address of each terminal 102, a MAC address, port information of the gateway 104 to which each terminal 102 is connected, or other state information.

At least one gateway 104 may be provided within the network considering the number of the terminals 102, a structure of the network, or the like.

The DHCPv6 server 106 is a device for allocating the IPv6 address in accordance with a method of allocating a stateful address in the IPv6 environment, allocates the IPv6 address to each terminal 102 in response to the request of the terminal 102, and stores and manages IPv6 address allocation information of each terminal 102. In this instance, address allocation information of each terminal may include at least one of an IPv6 address allocated to each terminal 102, a DUID value, and an initial address allocation time, and additionally include other DHCPv6 optional values such as a DNS address, a communication time between the terminal and the gateway, and the like, as necessary.

The apparatus 108 stores and manages integrated terminal management information by linking the address information stored in the ND cache 110 and the IPv6 address allocation information stored in the DHCPv6 server 106. Specifically, the apparatus 108 collects the address information of each terminal 102 stored in the ND cache 110 using SNMP or telnet connection script. In addition, the apparatus 108 collects IPv6 address allocation information about each terminal 102 from the DHCPv6 server 106, generates the integrated terminal management information by linking the address information and the IPv6 address allocation information, and stores and manages the generated integrated terminal management information. Hereinafter, the integrated terminal management information will be described in more detail.

Meanwhile, according to an embodiment, when the IPv4 address rather than the IPv6 address is separately allocated to each terminal 102, the system 100 may further include an IPv4 address allocation information database 112 in which information on the IPv4 address allocated to each terminal 102 is stored. The IPv4 address allocation information database 112 may link and store the IPv4 address allocated to each terminal 102 with a MAC address of each terminal 102. In this case, the apparatus 108 may receive IPv4 address allocation information including the IPv4 address and MAC address of each terminal 102 from the IPv4 address allocation information database 112, and link and store the received IPv4 address allocation information with the integrated terminal management information.

Figure 2:
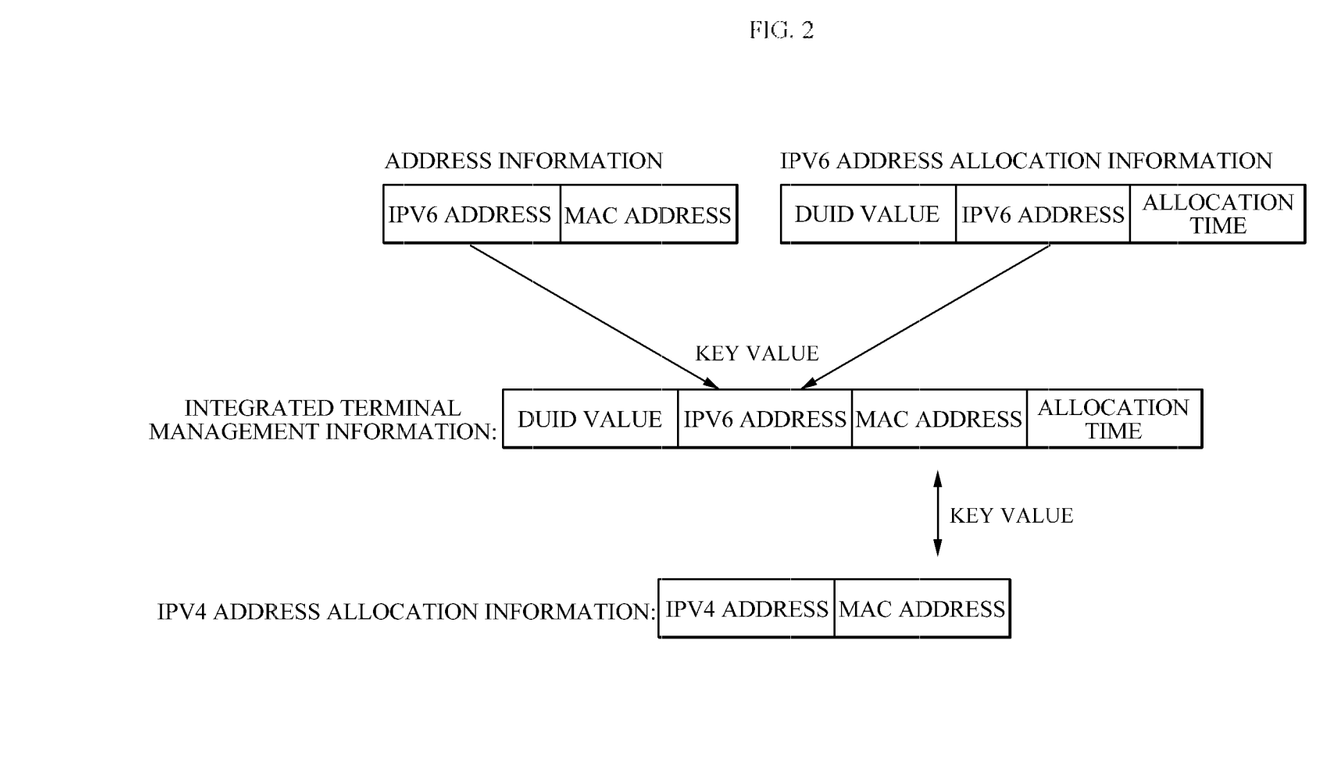
FIG. 2 is a diagram illustrating a process of generating integrated terminal management information in an apparatus 108 for integrated management of terminal information according to an embodiment of the present disclosure.

FIG. 2 is a diagram illustrating a process of generating integrated terminal management information in an apparatus 108 for integrated management of terminal information according to an embodiment of the present disclosure.

As described above, the ND cache 110 provided in the gateway 104 may acquire the IPv6 address and MAC address of each terminal 102 using the ND protocol. However, a time when the IPv6 address is initially allocated to each terminal 102 using the ND protocol may not be known, which is because the ND protocol is made only considering a method of allocating a stateless address.

Meanwhile, IPv6 address allocation information stored in the DHCPv6 server 106 includes the IPv6 address of each terminal 102, DUID information, and the initial address allocation time as described above, but does not include the MAC address of each terminal. This is because the address is allocated based on the DUID value rather than the MAC address due to rules (RFC3315) related to DHCPv6.

In order to solve such a problem, the apparatus 108 for integrated management of terminal information according to an embodiment of the present disclosure may generate the integrated terminal management information by linking the address and the IPv6 address allocation information using, as a key value, the IPv6 address commonly stored in the address information received from the ND cache 110 and the IPv6 address allocation information received from the DHCPv6 server 106, as shown in FIG. 2. In addition, as described above, when the system 100 for integrated management of terminal information according to an embodiment of the present disclosure further includes the IPv4 address allocation information database 112, the apparatus 108 may link and store the IPv4 address allocation information with the integrated terminal management information using the MAC address included in the IPv4 address allocation information stored in the IPv4 address allocation information database 112 as the key value.

In this manner, when the apparatus 108 generates and stores the integrated terminal management information, the IPv6 address of each terminal 102, the MAC address, the DUID value, the initial allocation time, and the IPv4 address are linked and managed in the integrated manner, and therefore required terminal information may be easily acquired regardless of whether the method of allocating the stateful address or the method of allocating the stateless address is used. In addition, as will be described later, security management of the network, fixed IP allocation, and the like may be significantly efficiently performed using the integrated terminal management information.

Figure 3:
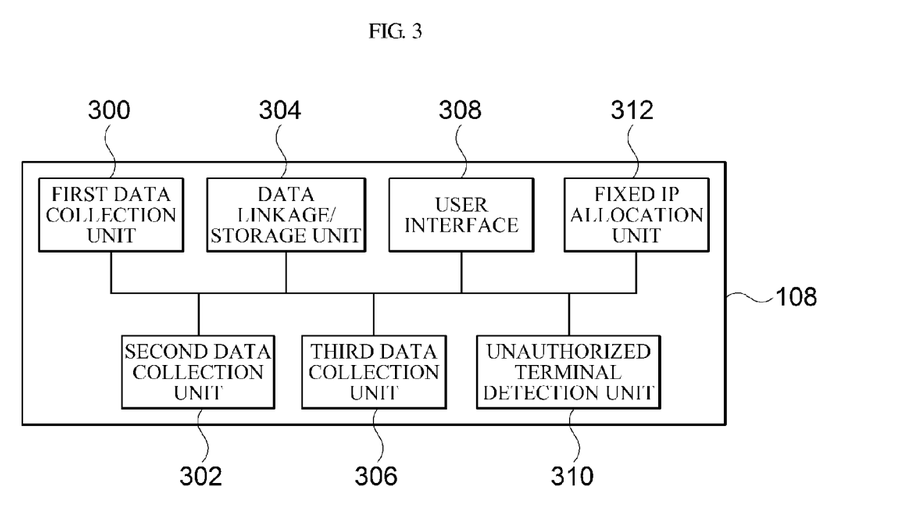
FIG. 3 is a block diagram illustrating a detailed configuration of an apparatus 108 for integrated management of terminal information according to an embodiment of the present disclosure.

FIG. 3 is a block diagram illustrating a detailed configuration of an apparatus 108 for integrated management of terminal information according to an embodiment of the present disclosure. As shown in FIG. 3, the apparatus 108 according to an embodiment of the present disclosure includes a first data collection unit 300, a second data collection unit 302, and a data linkage/storage unit 304, and may further include at least one of a third data collection unit 306, a user interface 308, an unauthorized terminal detection unit 310, and a fixed IP allocation unit 312, as necessary.

The first data collection unit 300 receives, from at least one ND cache 110 within the system 100, address information of the terminal acquired by the ND cache 110. In this instance, the address information includes an IPv6 address and a MAC address of each terminal 102.

The second data collection unit 302 receives, from the DHCPv6 server 106, IPv6 address allocation information allocated to the terminal 102 by the DHCPv6 server 106. In this instance, the IPv6 address allocation information may include at least one of an IPv6 address allocated to each terminal 102, a DUID value, and an initial address allocation time.

The data linkage/storage unit 304 generates integrated terminal management information by linking the address information received from the first data collection unit 300 and the IPv6 address allocation information received from the second data collection unit 302, and stores and manages the generated integrated terminal management information. The detailed descriptions of integrated terminal management information are the same as described in FIG. 2.

The third data collection unit 306 receives IPv4 address allocation information about each terminal 102 from the IPv4 address allocation information database 112. As described above, the IPv4 address allocation information includes the IPv4 address and a MAC address allocated to each terminal. In this case, the data linkage/storage unit 304 may link and store the IPv4 address allocation information and the integrated terminal management information using the MAC address included in the IPv4 address allocation information as the key value.

The user interface 308 may provide the integrated terminal management information stored in the data linkage/storage unit 304 in response to a request from a manager or the like, to a user. For this, the user interface 308 may include an input means such as a keyboard for input from a user and an output means such as a display for information output. For example, the user interface 308 may align and output the integrated terminal management information in response to an information inquiry request from the manager using a variety of criteria such as for each IPv6 address, for each MAC address, for each address allocation time, and the like. In addition, when the presence of an unauthorized terminal or the like is detected through the unauthorized terminal detection unit 310 to be described later, the user interface 308 may output a warning message for the detected presence of the unauthorized terminal.

The unauthorized terminal detection unit 310 detects the presence of the unauthorized terminal within the network using the address information and the IPv6 address allocation information which are acquired from the first data collection unit 300 and the second data collection unit 302. According to an embodiment of the present disclosure, the unauthorized terminal refers to a terminal to which the IPv6 address is not normally assigned through the DHCPv6 server 106. Specifically, when the IPv6 address allocation information corresponding to the IPv6 address included in the address information is absent, the unauthorized terminal detection unit 310 determines the terminal corresponding to the corresponding IPv6 address as the unauthorized terminal.

Figure 4:
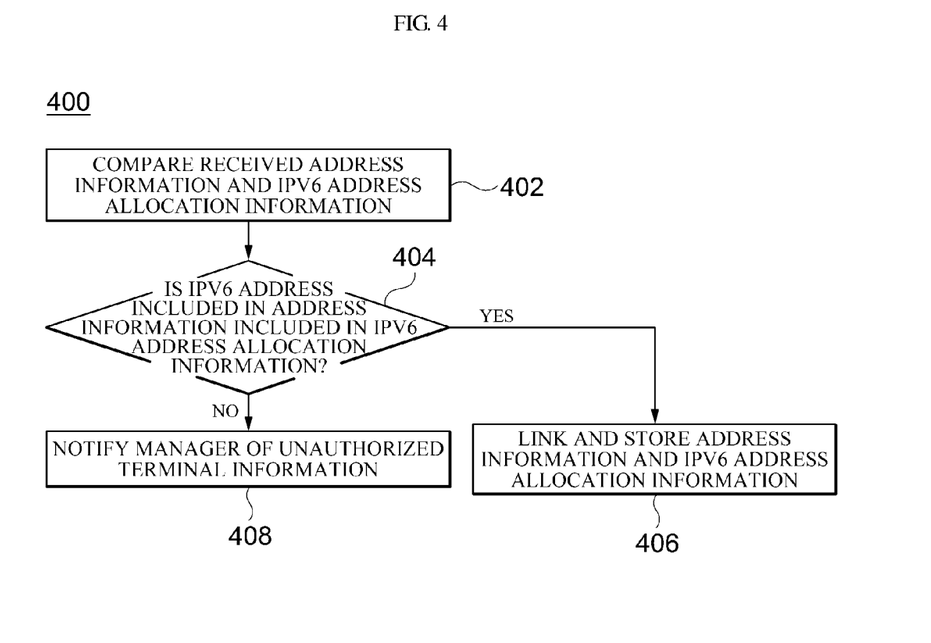
FIG. 4 is a flowchart illustrating a process of detecting an unauthorized terminal in an unauthorized terminal detection unit 310 according to an embodiment of the present disclosure.

FIG. 4 is a flowchart illustrating a process of detecting an unauthorized terminal in an unauthorized terminal detection unit 310 according to an embodiment of the present disclosure.

First, in operations 402 and 404, the unauthorized terminal detection unit 310 compares address information collected from the first data collection unit 300 and IPv6 address allocation information collected from the second data collection unit 302. In operation 406, when the IPv6 address allocation information corresponding to the IPv6 address recorded in the address information is present based on the comparison result, the unauthorized terminal detection unit 310 determines that the corresponding IPv6 address is allocated from the DHCPv6 server 106 normally, and requests storage of the address information and the IPv6 address allocation information from the data linkage/storage unit 304. That is, in this case, the data linkage/storage unit 304 may link and store the address information and IPv6 address allocation information of the corresponding terminal only with respect to the terminal which is not determined as the unauthorized terminal in the unauthorized terminal detection unit 310.

However, unlike this, in operation 408, when the IPv6 address allocation information corresponding to the IPv6 address recorded in the address information, that is, the DUID value of the corresponding IPv6 address, the initial allocation time information, or the like is determined not to be recorded based on the comparison result, the unauthorized terminal detection unit 310 may determine the corresponding terminal as the unauthorized terminal, and notify a manager of information (MAC address, port information, and the like) of the corresponding terminal through the user interface 308 or the like. Accordingly, the manager may take a step such as blocking network connection of the corresponding terminal or the like.

The blocking of the network connection of the unauthorized terminal may be performed in the following method. As described above, port information of the gateway 104 to which each terminal is connected may be included in the address information of the terminal collected in the first data collection unit 300. Thus, the unauthorized terminal detection unit 310 may notify the manager of the port information of the terminal determined as the unauthorized terminal, and the manager may block connection of the corresponding port of the gateway 104, thereby blocking the network connection of the unauthorized terminal. In this instance, the blocking of the network connection may be manually performed by the manager, or automatically performed through communication between the unauthorized terminal detection unit 310 and the gateway 104 or the like.

Meanwhile, when other applied terminals are simultaneously connected to the port to which the unauthorized terminal is connected, that is, when at least two terminals share the same port, it is impossible to block the connection of the corresponding port. Thus, in this case, by registering the MAC address of the unauthorized terminal in a connection blocking list based on the MAC address using the connection blocking list, the connection of the unauthorized terminal may be blocked.

The fixed IP allocation unit 312 receives a fixed IP allocation request from a specific terminal, and allocates a fixed IP to the specific terminal using the integrated terminal management information. In this instance, the fixed IP may include the IPv6 address and the IPv4 address linked with the IPv6 address.

Figure 5:
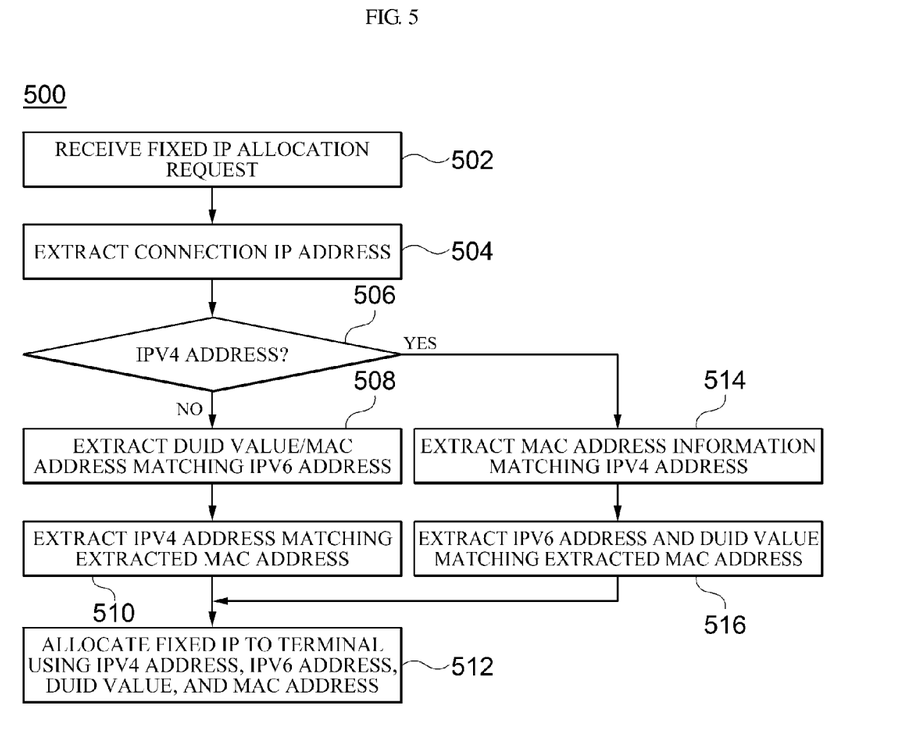
FIG. 5 is a flowchart illustrating a process of allocating a fixed IP in a fixed IP allocation unit 312 according to an embodiment of the present disclosure.

FIG. 5 is a flowchart illustrating a process of allocating a fixed IP in a fixed IP allocation unit 312 according to an embodiment of the present disclosure. First, when receiving a fixed IP allocation request from a specific terminal within a network, the fixed IP allocation unit 312 extracts a connection IP address of the specific terminal from the received fixed IP allocation request in operation 504, and then determines whether the extracted IP address is an IPv4 address or an IPv6 address in operation 506.

When the connection IP address is determined to be the IPv6 address, the fixed IP allocation unit 312 extracts a DUIP value and a MAC address each corresponding to the extracted IPv6 address using integrated terminal management information in operation 508, and acquires the IPv4 address corresponding to the MAC address extracted from the IPv4 address allocation information in operation 510. Next, in operation 512, the fixed IP allocation unit 312 allocates the fixed IP to the specific terminal using the acquired IPv4 address, IPv6 address, DUID value, and MAC address.

Meanwhile, when the connection IP address is determined to be the IPv4 address in operation 506, the fixed IP allocation unit 312 acquires a MAC address corresponding to the IPv4 address using the IPv4 address allocation information in operation 514, and acquires a DUIP value and an IPv6 address each matching the extracted MAC address using the integrated terminal management information in operation 516. Next, in operation 512, the fixed IP allocation unit 312 allocates the fixed IP to the specific terminal using the acquired IPv4 address, IPv6 address, DUID value, and MAC address.

Figure 6:
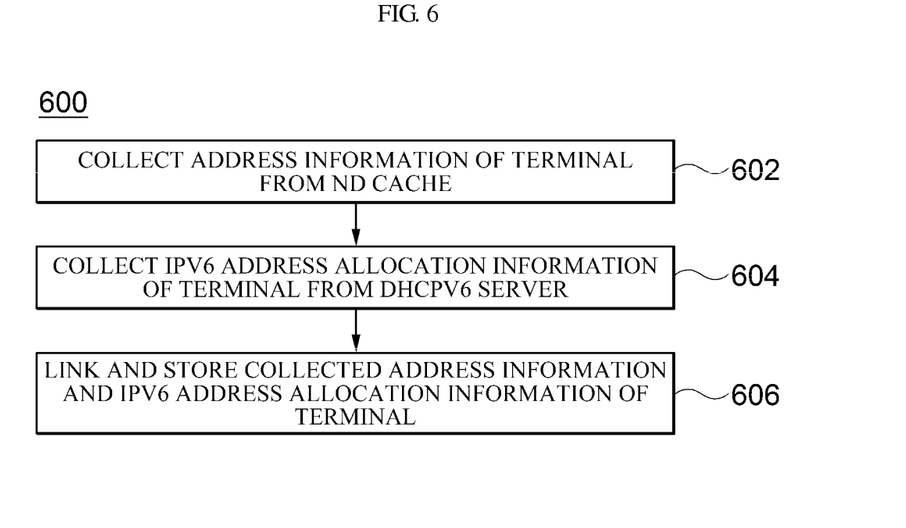
FIG. 6 is a flowchart illustrating a method 600 of integrated management of terminal information in an IPv6 environment according to an embodiment of the present disclosure.

FIG. 6 is a flowchart illustrating a method 600 of integrated management of terminal information in an IPv6 environment according to an embodiment of the present disclosure.

First, in operation 602, the first data collection unit 300 receives address information of the terminal 102 from at least one ND cache 110. As described above, the address information may include IPv6 address of each terminal 102 and a MAC address.

Next, in operation 604, the second data collection unit 302 receives IPv6 address allocation information allocated to the terminal 102 from the DHCPv6 server 106. In this instance, the IPv6 address allocation information may include at least one of an IPv6 address allocated to each terminal 102, a DUID value, and an initial address allocation time.

Next, in operation 606, the data linkage/storage unit 304 generates integrated terminal management information by linking the collected address information and IPv6 address allocation information, and stores the generated integrated terminal management information. In this instance, the data linkage/storage unit 304 may generate the integrated terminal management information by linking the address information and the IPv6 address allocation information in accordance with the address information and the IPv6 address of the terminal included in the IPv6 address allocation information.

As described above, according to the embodiments of the present disclosure, in the IPv6 environment or a dual stack environment, the IPv6 address, the MAC address, the DUID value, the initial allocation time, and the like of each terminal are linked and managed in the integrated manner, and therefore required terminal information may be easily acquired regardless of whether the method for allocating the stateful address or the method for allocating the stateless address is used for IP allocation of each terminal. In addition, the MAC address included in the integrated terminal management information is utilized as the reference value, and therefore linkage with the IPv4 address may be easily performed.

In addition, according to the embodiments of the present disclosure, security management of the network, fixed IP allocation, and the like may be significantly efficiently performed using the integrated terminal management information of each terminal.

The methods according to various embodiments of the present disclosure may be implemented in the form of software readable by various computer means and recorded in a computer-readable recording medium. The computer-readable recording medium may separately include program commands, local data files, local data structures, etc. or include a combination of them. The medium may be specially designed and configured for the present disclosure, or known and available to those of ordinary skill in the field of computer software. Examples of the computer-readable recording medium include magnetic media, such as a hard disk, a floppy disk, and a magnetic tape, optical media, such as a CD-ROM and a DVD, magneto-optical media, such as a floptical disc, and hardware devices, such as a ROM, a RAM, and a flash memory, specially configured to store and perform program commands. Examples of the program commands may include high-level language codes executable by a computer using an interpreter, etc. as well as machine language codes made by compilers.

It will be apparent to those skilled in the art that various modifications can be made to the above-described exemplary embodiments of the present disclosure without departing from the spirit or scope of the present disclosure. Thus, it is intended that the present disclosure cover all such modifications provided they come within the scope of the appended claims and their equivalents.

What is claimed is:

1. An apparatus for integrated management of terminal information in an IPv6 environment, the apparatus comprising:
a first data collection unit that receives, from at least one Neighbor Discovery (ND) cache, address information of at least one terminal acquired by the ND cache;
a second data collection unit that receives, from a DHCPv6 server, IPv6 address allocation information allocated to the at least one terminal by the DHCPv6 server;
a third data collection unit that receives, from an IPv4 address allocation information database, IPv4 address allocation information about each of the at least one terminal; and
a data linkage/storage unit that generates integrated terminal management information by linking the address information and the IPv6 address allocation information using, as a key value, an IPv6 address commonly stored in the address information received from the ND cache and the IPv6 address allocation information received from the DHCPv6 server,
wherein the IPv4 address allocation information includes an IPv4 address and a MAC address which are allocated to each of the at least one terminal, and
the data linkage/storage unit links and stores the IPv4 address allocation information and the integrated terminal management information using the MAC address included in the IPv4 address allocation information as a key value.

2. The apparatus of claim 1, wherein the address information includes at least one of an IPv6 address of each of the at least one terminal, a MAC address, and port information of a gateway to which the at least one terminal is connected.

3. The apparatus of claim 1, wherein the IPv6 address allocation information includes at least one of an IPv6 address allocated to each of the at least one terminal, a DUID (DHCPv6 Unique Identifier) value, and an initial address allocation time.

4. The apparatus of claim 1, further comprising:
a fixed IP allocation unit that receives a fixed IP allocation request from a specific terminal, and allocates a fixed IP including an IPv6 address and the IPv4 address linked with the IPv6 address to the specific terminal using the integrated terminal management information.

5. The apparatus of claim 4, wherein, when an IP address of the specific terminal included in the fixed IP allocation request is the IPv4 address, the fixed IP allocation unit acquires the IPv6 address linked with the IPv4 address, the MAC address, and a DUID (DHCPv6 Unique Identifier) value using the integrated terminal management information, and allocates the fixed IP to the specific terminal using the IPv4 address, the IPv6 address, the MAC address, and the DUID value.

6. The apparatus of claim 4, wherein, when an IP address of the specific terminal included in the fixed IP allocation request is the IPv6 address, the fixed IP allocation unit acquires the IPv4 address linked with the IPv6 address, the MAC address, and a DUID (DHCPv6 Unique Identifier) value using the integrated terminal management information, and allocates the fixed IP to the specific terminal using the IPv4 address, the IPv6 address, the MAC address, and the DUID value.

7. The apparatus of claim 1, further comprising:
an unauthorized terminal detection unit that detects presence/absence of an unauthorized terminal using the address information and the IPv6 address allocation information.

8. The apparatus of claim 7, wherein, when the IPv6 address allocation information corresponding to the IPv6 address included in the address information is absent, the unauthorized terminal detection unit determines the terminal corresponding to the corresponding IPv6 address as the unauthorized terminal.

9. The apparatus of claim 8, wherein the data linkage/storage unit links and stores address information and IPv6 address allocation information of the remaining terminals other than the terminal determined as the unauthorized terminal in the unauthorized terminal detection unit.

10. A method for integrated management of terminal information in an IPv6 environment, which is performed in an apparatus for integrated management of terminal information, the method comprising:
receiving, by a first data collection unit, address information of at least one terminal acquired by at least one ND cache from the at least one ND cache;
receiving, by a second data collection unit, IPv6 address allocation information allocated to the at least one terminal by a DHCPv6 server from the DHCPv6 server;
receiving, by a third data collection unit, IPv4 address allocation information about each of the at least one terminal, including an IPv4 address and a MAC address which are allocated to each of the at least one terminal, from an IPv4 address allocation information database;
generating and managing, by a data linkage/storage unit, integrated terminal management information by linking the address information and the IPv6 address allocation information using, as a key value, an IPv6 address commonly stored in the address information received from the ND cache and the IPv6 address allocation information received from the DHCPv6 server; and
linking and storing, by the data linkage/storage unit, the IPv4 address allocation information and the integrated terminal management information using the MAC address included in the IPv4 address allocation information as a key value.

11. The method of claim 10, wherein the address information includes at least one of an IPv6 address of each of the at least one terminal, a MAC address, and port information of a gateway to which the at least one terminal is connected.

12. The method of claim 10, wherein the IPv6 address allocation information includes at least one of an IPv6 address allocated to each of the at least one terminal, a DUID (DHCPv6 Unique Identifier) value, and an initial address allocation time.

13. The method of claim 10, further comprising, after the generating and managing of the integrated terminal management information:
receiving, by a fixed IP allocation unit, a fixed IP allocation request from a specific terminal, and allocating a fixed IP including an IPv6 address and the IPv4 address linked with the IPv6 address to the specific terminal using the integrated terminal management information.

14. The method of claim 13, wherein, when an IP address of the specific terminal included in the fixed IP allocation request is the IPv4 address, the allocating of the fixed IP includes acquiring the IPv6 address linked with the IPv4 address, the MAC address, and a DUID (DHCPv6 Unique Identifier) value using the integrated terminal management information, and allocating the fixed IP to the specific terminal using the IPv4 address, the IPv6 address, the MAC address, and the DUID value.

15. The method of claim 13, wherein, when an IP address of the specific terminal included in the fixed IP allocation request is the IPv6 address, the allocating of the fixed IP includes acquiring the IPv4 address linked with the IPv6 address, the MAC address, and a DUID (DHCPv6 Unique Identifier) value using the integrated terminal management information, and allocating the fixed IP to the specific terminal using the IPv4 address, the IPv6 address, the MAC address, and the DUID value.

16. The method of claim 10, further comprising, before the generating and managing of the integrated terminal management information:
detecting, by an unauthorized terminal detection unit, presence/absence of an unauthorized terminal using the address information and the IPv6 address allocation information.

17. The method of claim 16, wherein, when the IPv6 address allocation information corresponding to the IPv6 address included in the address information is absent, the detecting of the unauthorized terminal includes determining the terminal corresponding to the corresponding IPv6 address as the unauthorized terminal.

18. The method of claim 17, wherein the generating and managing of the integrated terminal management information includes linking and storing address information and IPv6 address allocation information of the remaining terminals other than the terminal determined as the unauthorized terminal in the unauthorized terminal detection unit.

* * * * *